US007865902B2

(12) United States Patent  
Childress et al.

(10) Patent No.: US 7,865,902 B2  
(45) Date of Patent: *Jan. 4, 2011

(54) METHOD AND APPARATUS FOR OPTIMIZING WEB SERVICES BINDING

(75) Inventors: Rhonda L. Childress, Austin, TX (US); David Bruce Kumhyr, Austin, TX (US); Neil R. Pennell, Cedar Creek, TX (US); Harold K. Ward, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 201 days.

This patent is subject to a terminal disclaimer.

(21) Appl. No.: 12/327,306

(22) Filed: Dec. 3, 2008

(65) Prior Publication Data

US 2009/0077566 A1 Mar. 19, 2009

Related U.S. Application Data

(63) Continuation of application No. 10/976,265, filed on Oct. 28, 2004, now Pat. No. 7,475,403.

(51) Int. Cl.  
*G06F 9/44* (2006.01)  
*G06F 15/16* (2006.01)

(52) U.S. Cl. ............... 719/313; 719/317; 719/332; 709/202; 709/206

(58) Field of Classification Search ............ 719/310, 719/311, 313, 317, 331, 332; 709/202, 203, 709/206, 223, 229, 250  
See application file for complete search history.

(56) References Cited

U.S. PATENT DOCUMENTS

| 6,792,605 | B1 | 9/2004 | Roberts et al. |
| 6,985,939 | B2 | 1/2006 | Fletcher et al. |
| 7,035,944 | B2 | 4/2006 | Fletcher et al. |
| 7,085,756 | B2 | 8/2006 | Carey et al. |
| 7,188,114 | B2 | 3/2007 | Liu et al. |
| 7,328,282 | B2 * | 2/2008 | Ganesan et al. ............ 709/246 |
| 7,467,206 | B2 * | 12/2008 | Moore et al. ............... 709/225 |
| 7,698,398 | B1 * | 4/2010 | Lai ............................ 709/223 |
| 2003/0126136 | A1 | 7/2003 | Omoigui |
| 2003/0233602 | A1 | 12/2003 | Lindquist et al. |
| 2004/0128622 | A1 | 7/2004 | Mountain et al. |
| 2004/0205765 | A1 | 10/2004 | Beringer et al. |
| 2005/0044197 | A1 * | 2/2005 | Lai ............................ 709/223 |
| 2005/0262188 | A1 | 11/2005 | Mamou et al. |
| 2006/0085342 | A1 | 4/2006 | Chen et al. |

* cited by examiner

*Primary Examiner*—Van H Nguyen  
(74) *Attorney, Agent, or Firm*—Yee & Associates, P.C.; Jeffrey S. LaBaw (57) ABSTRACT

A method, apparatus, and computer instructions for optimizing Web services binding. A request is received from a client for Web services binding information for a Web service. The current availability of the Web service requested by the client is identified in response to receiving the request to form an identified current availability. An indication of the identified current availability of the Web service is sent to the client in response to identifying the current availability of the Web service requested by the client. The client uses the indication of the identified current availability to selectively use the Web service.

18 Claims, 5 Drawing Sheets

METHOD AND APPARATUS FOR OPTIMIZING WEB SERVICES BINDING

This application is a continuation of application Ser. No. 10/976,265, filed Oct. 28, 2004, now U.S. Pat. No. 7,475,403.

BACKGROUND OF THE INVENTION

1. Technical Field

The present invention relates generally to an improved data processing system and in particular to a method and apparatus for processing data. Still more particularly, the present invention relates to a method, apparatus, and computer instructions for optimizing Web services binding.

2. Description of Related Art

The Internet is a global network of computers and networks joined together by means of gateways that handle data transfer and the conversion of messages from a protocol of the sending network to a protocol used by the receiving network. On the Internet, any computer may communicate with any other computer with information traveling over the Internet through a variety of languages, also referred to as protocols. The set of protocols used on the Internet is called transmission control protocol/Internet Protocol (TCP/IP).

The Internet has revolutionized both communications and commerce, as well as, being a source of both information and entertainment. For many users, email is a widely used format to communicate over the Internet. Additionally, the Internet is also used for real-time voice conversations.

With respect to transferring data over the Internet, the World Wide Web environment is used. This environment is also referred to simply as "the Web". The Web is a mechanism used to access information over the Internet. In the Web environment, servers and clients effect data transaction using the hypertext transfer protocol (HTTP), a known protocol for handling the transfer of various data files, such as text files, graphic images, animation files, audio files, and video files.

On the Web, the information in various data files is formatted for presentation to a user by a standard page description language, the hypertext markup language (HTML). Documents using HTML are also referred to as Web pages. Web pages are connected to each other through links or hyperlinks. These links allow for a connection or link to other Web resources identified by a universal resource identifier (URI), such as a uniform resource locator (URL).

A browser is a program used to look at and interact with all of the information on the Web. A browser is able to display Web pages and to traverse links to other Web pages. Resources, such as Web pages, are retrieved by a browser, which is capable of submitting a request for the resource. This request typically includes an identifier, such as, for example, a URL. As used herein, a browser is an application used to navigate or view information or data in any distributed database, such as the Internet or the World Wide Web. A user may enter a domain name through a graphical user interface (GUI) for the browser to access a source of content. The domain name is automatically converted to the IP address by a domain name system (DNS), which is a service that translates the symbolic name entered by the user into an IP address by looking up the domain name in a database.

The browser includes a user interface, which is a GUI that allows the user to interface or communicate with another browser. This interface provides for selection of various functions through menus and allows for navigation. For example, a menu may allow a user to perform various functions, such as saving a file, opening a new window, displaying a history, and entering a URL.

Web services are provided for use by various clients. A Web service is a programmable application, which is accessible as a component via standard Web protocols. A Web service typically uses standard protocols, such as HTTP, Extensible markup language (XML), and SOAP. These services may work through existing proxies and firewalls.

Web services include Web based applications that dynamically interact with other Web applications using open standards. These standards include universal description discovery and integration (UDDI) and SOAP. UDDI is a universal business registry or catalog of Web services that contains white pages with addresses and contacts, yellow pages containing industry classification, and green pages, containing description of services. SOAP is a message-based protocol based on XML for accessing services on the Web. Using these types and other standards, applications typically run behind the scenes with one program talking to another program.

Yellow pages and the other registries are the current mechanism used to publish, discover, and bind Web services. Registries typically contain data structures and other information used to describe Web services and Web service providers.

These programs typically communicate from server to server. With the use of open standards by Web services, a source may supply clients with client side software to add to the applications regardless of the platform. Dynamic Web service clients use a yellow pages directory service, typically UDDI, to find Web services description language (WSDL) bindings for services that the clients desire to use. WSDL is an XML based representation that describes the capabilities of the Web service. These descriptions are typically housed in a UDDI directory, and the combination helps promote the use of Web services on the Internet. Yellow pages and the other registries are the current mechanism used to publish, discover, and bind Web services. Registries typically contain data structures and other information used to describe Web services and Web service providers.

As long as the binding information obtained from the directory services is up to date and the service that the client is interested in is actually online, the use of this yellow page directory service provides useful information to the client to access Web services. Unfortunately, a client has no mechanism to determine whether these conditions are true. Currently, clients assume a relatively static environment and service providers are expected to keep finding information exploited to these types of directories up to date. However, when the information is incorrect, the usability of these types of directories decreases.

Therefore, it would be advantageous to have an improved method, apparatus, and computer instructions for providing binding or access to Web services.

SUMMARY OF THE INVENTION

The present invention provides a method, apparatus, and computer instructions for optimizing Web services binding. A request is received from a client for Web services binding information for a Web service. The current availability of the Web service requested by the client is identified in response to receiving the request to form an identified current availability. An indication of the identified current availability of the Web service is sent to the client in response to identifying the current availability of the Web service requested by the client.

The client uses the indication of the identified current availability to selectively use the Web service.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
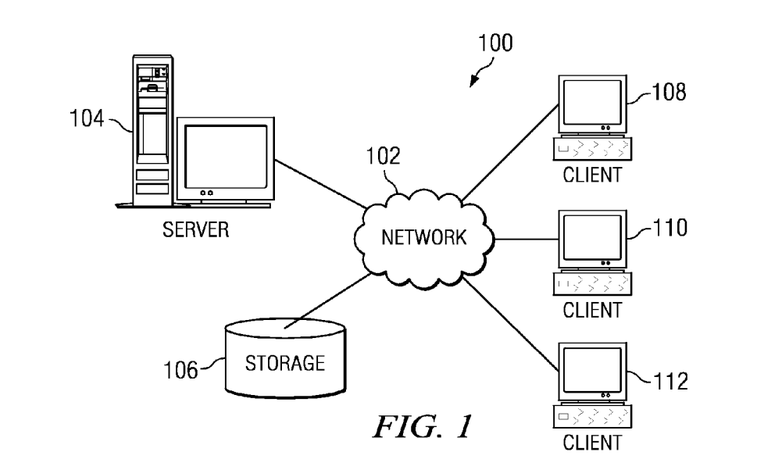
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
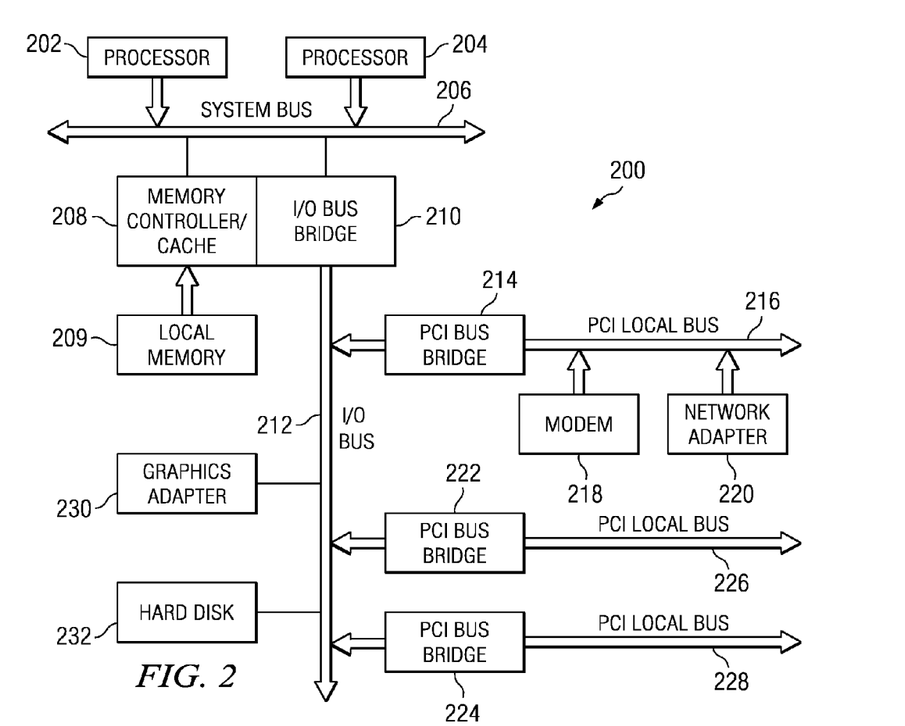
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
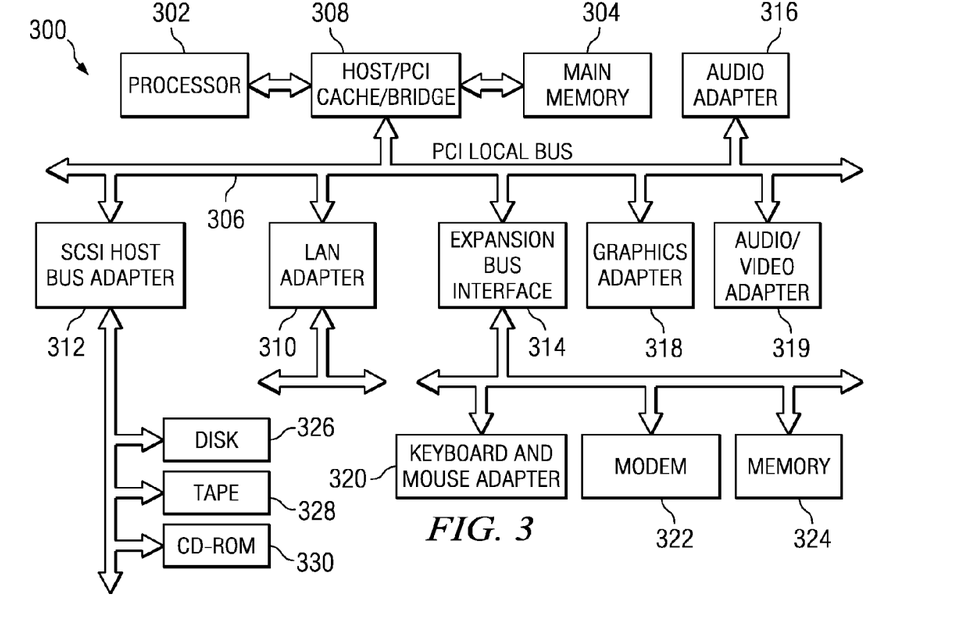
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides an improved method, apparatus, and computer instructions for optimizing Web services. When a request is received for a client for Web services information for a particular Web service, the current availability of the Web service is identified. An indication of this current availability of the Web service is sent to the client, wherein the client uses this indication to selectively use the Web service. In these examples, this current availability is whether the service is up and running at the time the query of the Web service is made. In these examples, the Web services information is Web services binding information. A binding defines message format and protocol details for operations and messages defined by a particular portType. There may be any number of bindings for a given portType. Additionally, in these examples, the binding information also includes the current availability of the Web service and may include other information, such as loading of the Web service and response times for the Web service.

The mechanism of the present invention employs a presence network to provide this availability information. In these illustrative examples, a presence network is a network that includes an instant messaging system that is used to transmit information between different components or data processing systems. The instant messaging system does not require human user intervention to provide the communications between different components or data processing systems.

The presence or availability information may be provided directly to a client when the client identifies a Web service from a registry of Web services, such as a yellow pages provider. Alternatively, the presence network may provide this availability information directly to the registry.

Further, the mechanism of the present invention allows for Web services providers to augment service and providing information exploited to registries, such as yellow pages directory services with a service presence identifier. When a client looks up binding information for a service, the presence identifier may be used to connect to the presence network to determine whether the service is currently available. Alternatively, the availability may be provided directly to the registry. The mechanism of the present invention provides an identifier for a service to connect to a presence network using its presence service identifier to provide information to the presence network, such as current availability of the Web service. Other information then may be provided to the presence network by service include, for example, loading of the service, response times statistics for the service, and updated binding information. Another example of information that may be provided is a general availability of the service. A service is considered to be generally available if the service is available at least some or perhaps most of the time. This type of availability is a different type of availability than the current availability of the service.

Figure 4:
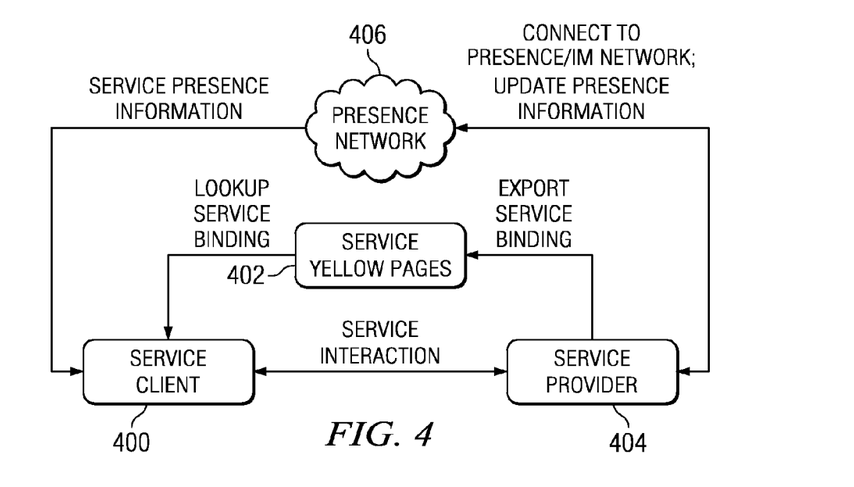
FIG. 4 is a diagram illustrating components used in providing presence-enhanced Web service binding in accordance with the preferred embodiment of the present invention.

Turning now to FIG. 4, a diagram illustrating components used in providing presence-enhanced Web service binding is depicted in accordance with the preferred embodiment of the present invention. In this illustrative example, service client 400 looks up service binding information in service yellow pages 402. Service yellow pages 402 is a registry of Web services. This registry may be implemented using UDDI. The information in service yellow pages 402 is provided by service providers.

In this example, service provider 404 exports service binding information to service yellow pages 402. Consequently, when service client 400 looks up information in service yellow pages 402, this client may obtain binding information needed to interact with a Web service provided by service provider 404.

The mechanism of the present invention includes presence network 406 when service binding information is obtained from service yellow pages 402. The Web service in service provider 404 connects to presence network 406 to provide updated presence information regarding the particular Web service.

Service client 400 also may obtain a service presence identifier from service yellow pages 402. This service presence identifier is used to obtain service presence information from presence network 406. The particular presence information is for a Web service for service provider 404 in this example. With the service presence identifier, service client 400 may request information regarding the availability of a service provided through service provider 404. Alternatively, a name or other lookup mechanism may be used by service client 400 to obtain the presence information for the Web service.

In these illustrative embodiments, the presence information includes the current availability of the Web service as well as other information that might be desired. This other information may include, for example, loading statistics, service response times statistics, and a location of the Web service.

This information is collected in presence network 406 and made available to service client 400, when service client 400 contacts with presence network 406 to request information regarding a particular Web service.

In these examples, presence network 406 is a network that includes an instant messaging system. Information from various Web services is collected through agents within presence network 406. These agents monitor information sent by various Web services to a chat group established for one or more Web services. This information is collected and made available to service clients.

Additionally, the different Web services may include monitoring agents that monitor or obtain the presence information from the different service providers. The information is exchanged through instant messaging protocols. A number of different agents may form a chat group in which each agent collects or receives presence information from one or more Web services for different service providers.

Service client 400 sends queries to presence network 406 to identify services that are presently available from service yellow pages 402.

Figure 5:
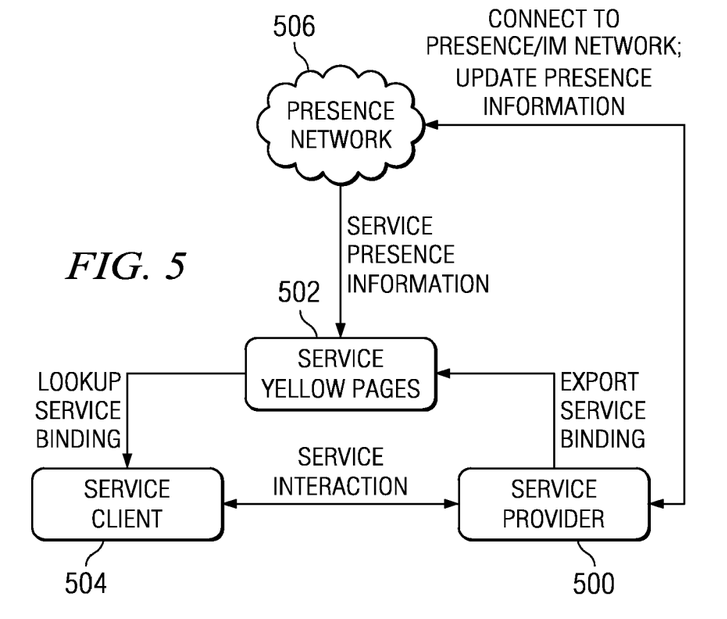
FIG. 5 is a diagram illustrating components in a presence-enhanced Web service binding system in accordance with the preferred embodiment of the present invention.

Turning next to FIG. 5, a diagram illustrating components in a presence-enhanced Web service binding system is depicted in accordance with the preferred embodiment of the present invention. In this illustrative example, service provider 500 exports service binding information to a registry, such as service yellow pages 502. This information may be obtained by various clients, such as service client 504. In obtaining this binding information, service client 504 obtains information needed to interact with a Web service provided through service provider 500. Additionally, the information provided in service yellow pages 502 is enhanced with service presence information.

In this particular illustrative example, service client 504 is not required to contact presence network 506. In this particular example, the service presence information is sent by presence network 506 directly to service yellow pages 502. Various agents at service provider 500 contact presence network 506 to update presence information regarding the different Web services available. In these examples, the availability is whether the service is up and running at the present time.

Figure 6:
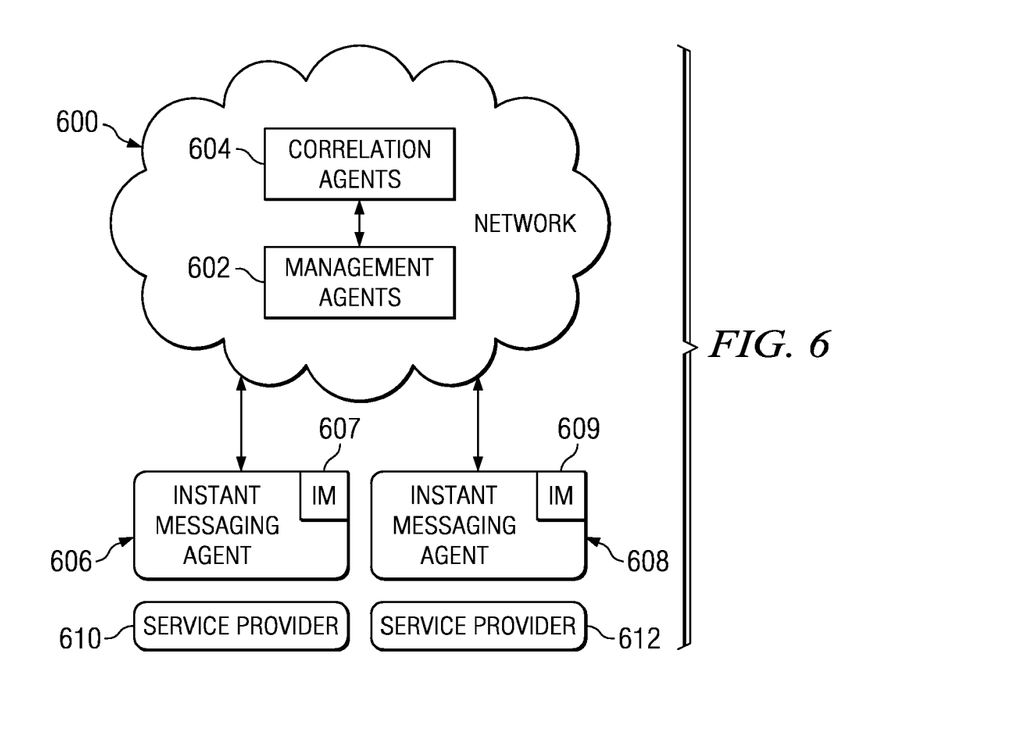
FIG. 6 is a diagram illustrating components in providing presence information in accordance with the preferred embodiment of the present invention.

Turning now to FIG. 6, a diagram illustrating components in providing presence information is depicted in accordance with the preferred embodiment of the present invention. In this example, network 600 forms a presence network, such as presence network 406 in FIG. 4 or presence network 506 in FIG. 5. Network 600 includes management agents 602. These management agents include instant messaging capabilities used to receive information regarding different Web services. These management agents are assigned to a chat group that receives presence information from the different Web services. The information from management agents 602 may then be correlated by correlation agents 604. This correlation agent is a process that collects the information received by management agents 602. Correlation agents 604 may then provide the information to clients or registries.

Management agents 602 receive presence information from different agents associated with service providers. In this example, instant messaging agent 606 and instant messaging agent 608 log onto chat groups associated with management agents 602 and send presence information. Instant messaging agent 606 monitors Web services provided through service provider 610, while instant messaging agent 608 monitors Web services through service provider 612. These agents monitor for information identifying the current availability of Web services for these types of service providers. These instant messaging agents also may provide other information including, for example, loading statistics and response times statistics.

These agents log onto chat groups associated with management agents 602 and network 600. The information is then sent to those chat groups. Other information that also may be sent to management agents 602 in addition to the current availability of a Web service includes updates for changes to binding information. The information may then be provided to registries or clients through correlation agents 604. All of the agents include instant messaging capabilities and communicate with each other through instant messaging protocols.

Instant messaging agents 606 include instant messaging process 607. Instant messaging agent 608 includes instant messaging process 609. These instant messaging processes are used to connect to management agents 602 in network 600. In particular, the instant messaging agents used these processes to connect to chat groups associated with these management agents. The information is sent to these management agents through instant messaging messages. Various agents may be implemented on different data processing systems in network 600.

Figure 7:
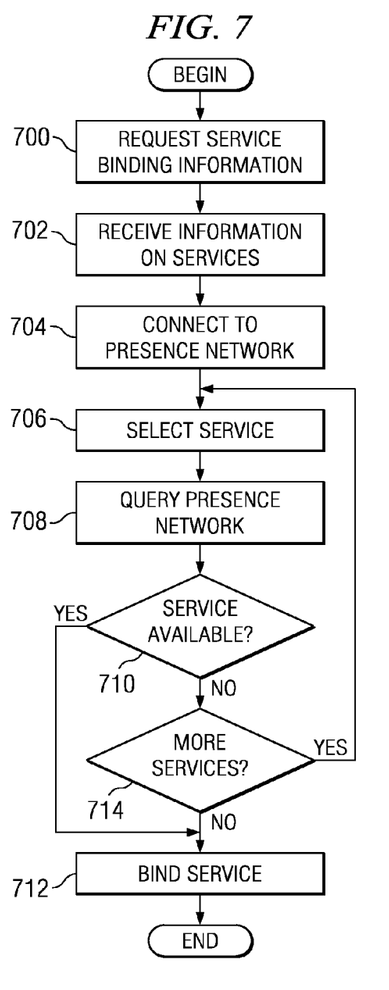
FIG. 7 is a flowchart of a process for binding to a Web service in accordance with the preferred embodiment of the present invention.

Turning now to FIG. 7, a flowchart of a process for binding to a Web service is depicted in accordance with the preferred embodiment of the present invention. The process illustrated in FIG. 7 may be implemented in a service client, such as service client 400 in FIG. 4.

The process begins by requesting service binding information (step 700). This request is made to a registry, such as service yellow pages 402 in FIG. 4. In response to making this request, information for one or more services is received (step 702). Thereafter, a connection is made to a presence network (step 704). A service is selected (step 706). The presence network is then queried regarding that service (step 708). A determination is made as to whether the service is currently available (step 710). In step 710, the determination is made to see whether the service is up and running at the present time.

If the service is currently available, the process binds to the service (step 712) with the process terminating thereafter. If the service is not currently available, a determination is made as to whether service binding information has been received for additional services (step 714). If additional services are present, the process returns to step 706 to select another service. Otherwise, the process terminates.

Figure 8:
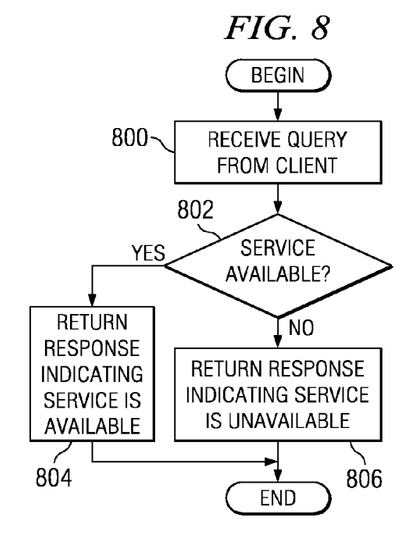
FIG. 8 is a flowchart of a process for providing presence information in accordance with the preferred embodiment of the present invention.

Turning now to FIG. 8, a flowchart of a process for providing presence information is depicted in accordance with the preferred embodiment of the present invention. The process illustrated in FIG. 8 may be implemented in a correlation agent, such as correlation agent 600 in FIG. 6.

The process begins by receiving a query from a client (step 800). This query includes an identification of the service. This query may be made in various ways. For example, a name of a service may be used to correlate the name with a service identifier to find the particular service. Alternatively, the client may provide the presence identifier for the particular service.

A determination is made as to whether the service is available (step 802). This determination is made by identifying the current presence information for the service. If the service is currently available, a response is returned to the client indicating that the service is currently available (step 804). Otherwise, a response is returned indicating that the service is unavailable (step 806) with the process terminating thereafter.

Figure 9:
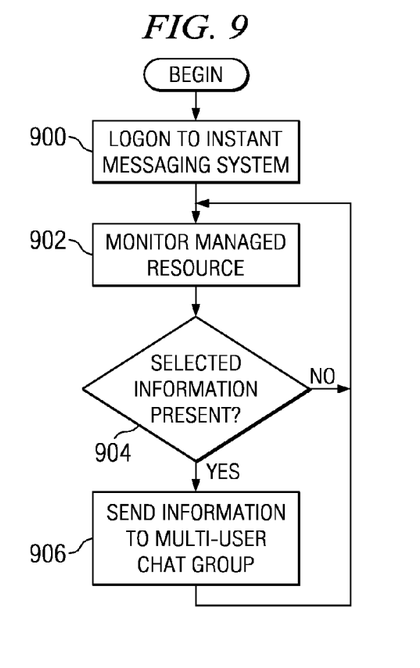
FIG. 9 is a flowchart of a process for providing presence information to a presence network in accordance with the preferred embodiment of the present invention.

Turning now to FIG. 9, a flowchart of a process for providing presence information to a presence network is depicted in accordance with the preferred embodiment of the present invention. The process illustrated in FIG. 9 may be implemented in an instant messaging agent, such as instant messaging agent 606 in FIG. 6.

The process begins by logging onto an instant messaging system (step 900). In this example, the instant messaging system is one in a presence network, such as network 600 in FIG. 6. The managed resource is then monitored (step 902). In this example, the managed resource is one or more Web services.

A determination is then made as to whether the selected information is present at the managed resource (step 904). This selected information includes whether the particular service is currently available. The selected information also may include other information, such as loading statistics, response times statistics, and a location of the Web service. If the information is present, the process sends the information to a multi-user chat group in the presence network (step 906) with the process then returning to step 902.

With reference again to step 904, if the selected information is not present, the process also returns to step 904 to continue to monitor the managed resource.

Figure 10:
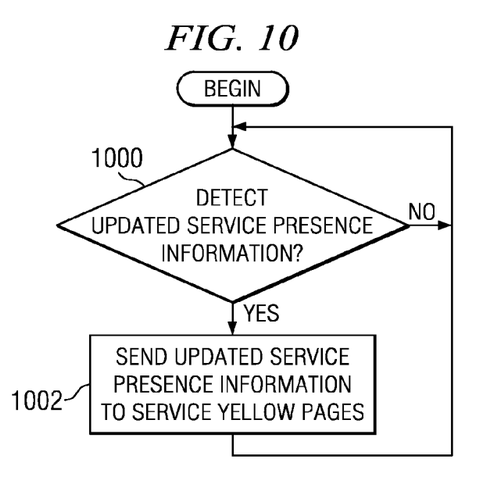
FIG. 10 is a flowchart of a process for providing presence information to a registry in accordance with the preferred embodiment of the present invention.

Turning now to FIG. 10, a flowchart of a process for providing presence information to a registry is depicted in accordance with the preferred embodiment of the present invention. The process illustrated in FIG. 10 may be implemented in a correlation agent, such as correlation agent 604 in FIG. 6.

The process begins by detecting updated service presence information (step 1000). This information may include, for example changes in availability of one or more services. Additionally, changes in statistics such as loading and response times also make up this presence information. If changes in the service presence information is not detected, the process returns to step 1000. Otherwise, the updated service presence information is sent to the service yellow pages (step 1002) with the process returning to step 1000.

Although the depicted examples illustrate the use of service yellow pages for registries regarding Web services, the mechanism of the present invention may be applied to and used with any sort of registry that is used to provide information about Web services.

Figure 11:
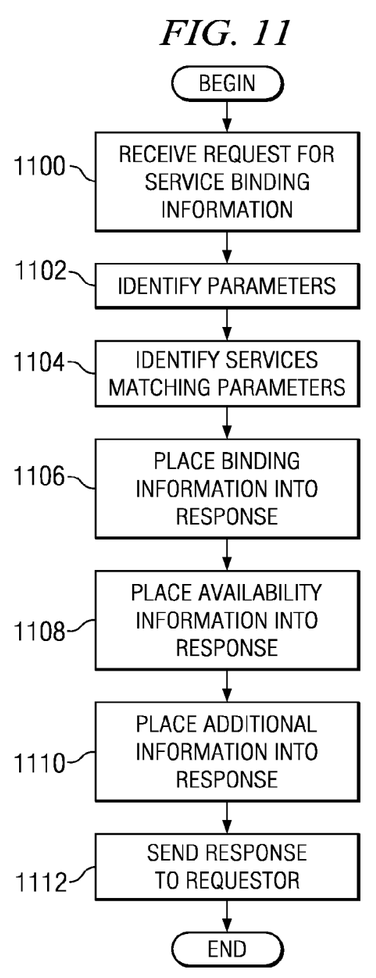
FIG. 11 is a flowchart of a process for providing binding and availability of information to a service client in accordance with the preferred embodiment of the present invention.

Turning now to FIG. 11, a flowchart of a process for providing binding and availability of information to a service client is depicted in accordance with the preferred embodiment of the present invention. The process illustrated in FIG. 11 may be implemented in a registry, such as service yellow pages 502 in FIG. 5.

The process begins by receiving a request for service binding information from a client (step 1100). The parameters are then identified (step 1102). The parameters may include, for example, a particular type of service, or a particular type of interface desired for the service. Services matching these parameters identified in the registries (step 1104).

Thereafter, binding information for the matching services is placed into a response (step 1106). Additionally, availability information for each of these services is identified in the registry and placed into the response (step 1108). Further, additional information regarding the service also may be placed into the response (step 1110). This additional information includes, for example, a location of the service, loading statistics for the service, and response times for the service. Thereafter, the response is send to the requester (step 1112) with the process terminating thereafter.

Thus, the present invention provides an improved method, apparatus, and computer instructions for providing access to Web services. The mechanism of the present invention employs a presence network to obtain updated information regarding the current availability of different services. This information is then provided to a client in response to the client requesting information about the particular Web service. In these examples, the request is for binding information. Of course, the request could be for other types of information other than binding information, depending on the particular implementation.

This availability information regarding different services may be provided directly to the service client. Alternatively, the information may be placed into the particular registry with this information being sent back to the client along with other information requested by the client.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for optimizing Web services binding, the method comprising:

receiving a request from a client for Web services binding information for a Web service;

identifying a current availability of the Web service requested by the client in response to receiving the request to form an identified current availability by connecting to a component in a presence network to obtain the Web services binding information and presence information regarding the current availability of the Web service, wherein the Web services binding information and the presence information is automatically updated through the presence network using an instant messaging system that is included in the presence network, and wherein the instant messaging system automatically collects the presence information from a Web services provider of the Web service using management agents within the presence network; and sending an indication of the identified current availability of the Web service to the client in response to identifying the current availability of the Web service requested by the client, wherein the client uses the indication of the identified current availability to selectively use the Web service.

2. The method of claim 1, wherein the identifying step includes:
   identifying Web services binding information, wherein the Web services information includes the current availability of the Web service and wherein the Web services binding information is updated through the presence network.

3. The method of claim 1, wherein the receiving step, the identifying step, and the sending step are located in the presence network.

4. The method of claim 1, wherein the receiving step, the identifying step, and the sending step are located in a registry.

5. The method of claim 1 further comprising:
   sending information on at least one of loading of the Web service, response times for the Web service, a general availability of the Web service, and binding information for the Web service.

6. The method of claim 1, wherein the request includes a service presence identifier to identify the Web services provider.

7. A data processing system including at least one processor for optimizing Web services binding, the data processing system comprising:
   receiving means for receiving a request from a client for Web services binding information for a Web service;
   identifying means for identifying a current availability of the Web service requested by the client in response to receiving the request to form an identified current availability by connecting to a component in a presence network to obtain the Web services binding information and presence information regarding the current availability of the Web service, wherein the Web services binding information and the presence information is automatically updated through the presence network using an instant messaging system that is included in the presence network, and wherein the instant messaging system automatically collects the presence information from a Web services provider of the Web service using management agents within the presence network; and
   sending means for sending an indication of the identified current availability of Web service to the client in response to identifying the current availability of the Web service corresponding to the Web service requested by the client, wherein the client uses the indication of the identified current availability to selectively use the Web service.

8. The data processing system of claim 7, wherein the identifying means includes:
   means for identifying Web services information, wherein the Web services binding information includes the current availability of the Web service and wherein the Web services binding information is updated through the presence network.

9. The data processing system of claim 7, wherein the receiving means, the identifying means, and the sending means are located in the presence network.

10. The data processing system of claim 7, wherein the receiving means, the identifying means, and the sending means is located in a registry.

11. The data processing system of claim 7 further comprising:
    sending means for sending information on at least one of loading of the Web service, response times for the Web service, a general availability of the Web service, and binding information for the Web service.

12. The data processing system of claim 7, wherein the request includes a service presence identifier to identify the Web services provider.

13. A computer program product in a recordable-type medium for optimizing Web services binding, the computer program product comprising:
    first instructions for receiving a request from a client for Web services binding information for a Web service;
    second instructions for identifying a current availability of the Web service requested by the client in response to receiving the request to form an identified current availability by connecting to a component in a presence network to obtain the Web services binding information and presence information regarding the current availability of the Web service, wherein the Web services binding information and the presence information is automatically updated through the presence network using an instant messaging system that is included in the presence network, and wherein the instant messaging system automatically collects the presence information from a Web services provider of the Web service using management agents within the presence network; and
    third instructions for sending an indication of the identified current availability of the Web service to the client in response to identifying the current availability of the Web service requested by the client, wherein the client uses the indication of the identified current availability to selectively use the Web service.

14. The computer program product of claim 13, wherein the second instructions includes:
    sub instructions for identifying Web services binding information, wherein the Web services binding information includes the current availability of the Web service and wherein the Web services information is updated through the presence network.

15. The computer program product of claim 13, wherein the first instructions, the second instructions, and the third instructions are executed in the presence network.

16. The computer program product of claim 13, wherein the first instructions, the second instructions, and the third instructions are executed in a registry.

17. The computer program product of claim 13 further comprising:
    fourth instructions for sending information on at least one of loading of the Web service, response times for the Web service, a general availability of the Web service, and binding information for the Web service.

18. The computer program product of claim 13, wherein the request includes a service presence identifier to identify the Web services provider.

* * * * *